(12) United States Patent
Matsumoto et al.

(10) Patent No.: US 7,558,646 B2
(45) Date of Patent: Jul. 7, 2009

(54) COOPERATIVE CONTROL SYSTEM OF ROBOTS

(75) Inventors: Naoyuki Matsumoto, Kobe (JP);
Masatoshi Sano, Kakogawa (JP);
Tsuyoshi Maehara, Itami (JP);
Nobuyasu Shimomura, Kobe (JP);
Takahiro Ueno, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 849 days.

(21) Appl. No.: 10/494,583

(22) PCT Filed: Nov. 7, 2002

(86) PCT No.: PCT/JP02/11620

§ 371 (c)(1),
(2), (4) Date: Oct. 12, 2004

(87) PCT Pub. No.: WO03/039817

PCT Pub. Date: May 15, 2003

(65) Prior Publication Data

US 2005/0055132 A1    Mar. 10, 2005

(30) Foreign Application Priority Data

Nov. 7, 2001    (JP)    ............... 2001-341905

(51) Int. Cl.
*G05B 19/042*    (2006.01)

(52) U.S. Cl. ............... 700/249; 700/1; 700/2; 700/3; 700/4; 700/14; 700/19; 700/20; 700/67; 700/72; 700/213; 700/214; 700/215; 700/216; 700/217; 700/218; 700/219; 700/220; 700/221; 700/222; 700/223; 700/224; 700/225; 700/226; 700/227; 700/228; 700/229; 901/6; 318/568.11; 318/484; 318/486; 318/543; 318/546; 318/547; 318/548

(58) Field of Classification Search ......... 700/245, 700/1–4, 14, 19–20, 67, 72, 213–229, 247–254; 901/6; 318/568.11, 484, 486, 543, 546, 547, 318/548
See application file for complete search history.

(56) References Cited

U.S. PATENT DOCUMENTS 6,434,448 B1 *    8/2002    Kosaka et al. ............... 700/245

FOREIGN PATENT DOCUMENTS

| EP | 1090722 A2 * | 4/2001 |
|---|---|---|
| JP | A 5-111897 | 5/1993 |
| JP | A 5-250017 | 9/1993 |
| JP | A 7-20915 | 1/1995 |
| JP | B2 8-381 | 1/1996 |
| JP | A 9-69007 | 3/1997 |
| JP | A 9-85654 | 3/1997 |
| JP | B2 2621560 | 4/1997 |
| JP | A 9-207088 | 8/1997 |
| JP | B2 2687936 | 8/1997 |
| JP | A 10-272583 | 10/1998 |
| JP | B2 2880590 | 1/1999 |
| JP | A 2001-150372 | 6/2001 |

* cited by examiner

*Primary Examiner*—Khoi Tran
*Assistant Examiner*—Nikhil Sriraman
(74) *Attorney, Agent, or Firm*—Oliff & Berridge, PLC

(57) ABSTRACT

The present invention has a communication connection means (21) which mutually connects communicatably control units (Ca, Cb) for individually controlling operations of robots (Ra, Rb) to constitute a network, input means (37a, 37b) which are respectively installed in the control units and input operation instructions of the robots, and timing signal generation means (69a, 69b). The control units are selectively set to any one of an independent function execution mode, a master function execution mode, and a slave function execution mode, and among the control units, the control unit (Ca) to perform a master operation is set to the master function execution mode, and the residual control unit (Cb) is set to the slave function execution mode, and by correcting a minimum interruption period (Ts(b)) of the slave side control unit (Cb), a control time (ta11, ta12, ta13) to the master robot (Ra) of the master side control unit (Ca) is delayed by a predetermined time (T) to perform the cooperative operation. By doing this, the control units are always kept in the synchronized state, thus the operations of the robots can be prevented from variations.

22 Claims, 9 Drawing Sheets

```
PROGRAM master()                    PROGRAM slave()
  1  JMOVE       #1c1_0               1  JMOVE        #1c2_0
  2  LMOVE       #1c1_1               2  LMOVE        #1c2_1
  3  CLOSE                            3  CLOSE
  4  MASTER                           4  SWAIT   1002
  5  SIGNAL   2                       5  SLAVE
  6  SIGNAL   2 : 2                   6  ALONE
  7  MLLMOVE    #1c1_2,#1c2_2         7  OPEN
  8  MLLMOVE    #1c1_3,#1c2_3         8  SIGNAL   2
  9  SWAIT  1001                      9  LMOVE        #1c2_9
 10  SWAIT  2 : 1001                 10  HOME
 11  MLC1MOVE   #1c1_4,#1c2_4       END
 12  MLC1MOVE   #1c1_5,#1c2_5
 13  MLC2MOVE   #1c1_6,#1c2_6
 14  MLLMOVE    #1c1_7,#1c2_7
 15  MLLMOVE    #1c1_8,#1c2_8
 16  ALONE
 17  OPEN
 18  SWAIT 1002
 19  LMOVE       #1c1_9
 20  HOME
END
```

FIG. 10

COOPERATIVE CONTROL SYSTEM OF ROBOTS

TECHNICAL FIELD

The present invention relates to a cooperative control system of robots of which control units, which may be called robot controllers installed respectively in a plurality of robots, are connected to a communication network and the robots are operated cooperatively.

BACKGROUND ART

Conventionally, when a workpiece is heavy or large, to realize a cooperative operation for transferring the workpiece precisely and stably by maintaining the state of surely holding the workpiece by a plurality of robots via a plurality of preset teaching points extending from the departure point to the arrival point and interpolation points between the teaching points, a cooperative control system for cooperatively controlling each robot is adopted.

In such a cooperative control system using a plurality of robots, a workpiece can be held at a plurality of positions according to the arrangement positions of the robots in the working space, so that even if the workpiece is large, it can be transferred stably. Further, even if the workpiece is heavy, the weight of the workpiece is dispersed to the plurality of robots, so that the weight load and inertia load of each robot are little, thus the transfer speed can be increased and the transfer time can be shortened.

With respect to the aforementioned cooperative control system, there are a "many:1" system for generally controlling a plurality of robots by one control unit and a "1:1" system individually having a control unit corresponding to each robot available. In the "many:1" system for generally controlling a plurality of robots by one control unit, one control unit must control a plurality of robots, so that the control unit has a special constitution.

On the other hand, in the "1:1" system which is equipped with control units respectively for a plurality of robots and individually controls the robots, one control unit controls one robot, so that there is no need to use control units having a special constitution like the aforementioned "many:1" system and general-purpose control units can be used. Therefore, compared with the "many:1" system, the "1:1" system can easily realize a cooperative control system by introducing a cooperative control program and is excellent in the easiness of realization.

Moreover, the aforementioned general-purpose control unit can be used independently for other uses without constructing a cooperative control system and the control unit purchase cost can be saved, so that the general-purpose control unit has an advantage of being economical. Furthermore, the number of robots can be freely changed, so that the general-purpose control unit can freely respond to the system design and it has an advantage of having a high degree of freedom in the system design.

Furthermore, in another conventional art, in the aforementioned "1:1" individual cooperative control system individually equipped with control units for a plurality of robots, an individual control system for preparing a program for each robot and controlling the transfer operation using interlocks and a master/slave cooperative control system for setting one of a plurality of robots as a master robot, setting the other robots excluding the master robot as slave robots synchronizing with and following the master robot, cooperatively controlling the master robot and slave robots by a software program loaded in the master robot, thereby transferring a workpiece are known.

In the aforementioned master/slave cooperative control system, when the operation of robot must be changed due to changing of a workpiece and changing of transfer conditions, only the program loaded in the master robot may be changed, so that the system has an advantage that the program can be easily changed, prepared, and managed. Therefore, among a plurality of control units realized by a general-purpose robot controller, one master control unit is selected and the residual one or plural slave control units are cooperatively operated.

In such a system for cooperatively controlling between the master and slave robots, when data is to be transmitted and received between control units connected by a bus or a communication line, the control units constituting control systems individually and independently for each robot must be mutually synchronized. As a method for synchronization, when the control units are connected by a bus and data is to be transmitted and received between the control units by a shared memory method, there are a method for setting a flag on the shared memory and a method for generating an event in the interruption process using an interruption available.

FIG. 11 is a block diagram showing a part of the constitution in the software program for synchronizing the control units A and B of the master robot and slave robots in the master/slave cooperative control system of the conventional art. The conventional art is structured so that to in order to synchronize the control units A and B by the shared memory method, as viewed from the master side control unit A for controlling the master robot and the slave side control unit B for controlling the slave robots, a processing unit 2 of the master side control unit A writes the instruction value into a flag 4 on a shared memory 3 of the slave side control unit B, and a processing unit 5 of the slave side control unit B stands by until the instruction value is written into the flag 4 on the shared memory 3. Moreover, in order to monitor the flag 4 after the processing operation of the processing unit 5 of the slave side control unit B is finished, the polling operation is performed, and an event occurred at the time of a synchronization can be processed.

FIG. 12 is a block diagram for explaining the method for synchronizing the control units A and B by the interruption used in the master/slave cooperative control system of another conventional art. Between the control units A and B, when an interruption instruction from a processing unit 11 of the control unit A is input to the control unit B via a communication line 10, the control unit B activates an interruption processing means 12, generates an event in the interruption processing means 12, and activates a processing means 13. The processing means 13 of the control unit B, when the event process is finished, enters again the event standby state.

Still another conventional art is disclosed in Japanese Patent Laid-Open Publication 7-20915. In this conventional art, a cooperative control system of robots to be cooperatively controlled which includes two robots having an arm which are a control object of the cooperative operation and control units for individually controlling the robots and uses one among the robots as a master robot and the other as a slave robot is disclosed.

The respective control units perform interpolation calculations on the basis of the teaching point data and decide the passing point to which the arm of the master robot moves, and the next passing point of the arm of the slave robot is decided in either of the control units on the basis of the point to which the arm of the master robot moves next and the relative position and posture relationships of both arms corresponding to the state of a workpiece during transportation. The master side control unit decides the next passing point of the arm according to the given teaching contents and transmits the data to the slave side control unit. Thereby, the next passing point of the arm of the slave robot is decided. These control units, to transmit and receive mutual data as mentioned above, are connected by a communication line. Further, the control units, to synchronize with each other, use a clock signal from a clock oscillation circuit built in the CPU (central processing unit) of each of the control units and data and a program which are necessary for the cooperative operation are all stored in the memory of the control unit common to the master and slave robots.

In the conventional arts shown in FIGS. 11 and 12, a problem arises that a useless waiting time such as polling for the flag or stand by for an event is generated. Further, in the aforementioned conventional art disclosed in Japanese Patent Application 7-20915, to cooperatively operate the master arm and slave arm, when synchronizing the control units with each other, a concrete countermeasure is not adopted to cancel a fine difference between the synchronizing signals of the control units, a displacement in the control period due to accumulation of a fine difference between the transmission period and the reception period, and an inevitable communication delay by the communication line. As a result, a problem arises that a plurality of control units cannot be maintained always in the synchronization state. Furthermore, a method for inputting an operation instruction from input means respectively provided in control means installed for each robot, a method for transmitting and receiving signals between input/output means for each robot, and a method for responding to an error in setting of the relative position of the respective robots are not taken into account, so that it is practically impossible to construct a cooperative control system.

Therefore, an object of the present invention is to provide a cooperative control system of robots capable of canceling synchronization variations of a plurality of control units and preventing variations in the cooperative operation of robots.

DISCLOSURE OF INVENTION

The cooperative control system of robots of the present invention has a plurality of control units for controlling individually respective operations of a plurality of robots in synchronization with a timing signal generated in a predetermined minimum interruption period, a communication connection means which communicatably connects the control units to each other and constitutes a network, input means which are respectively installed in the control units and input operation instructions of the robots, storage means which are respectively installed in the control units and store programs for operating the robots in response to the operation instructions of the robots, and timing signal generation means which are respectively installed in the control units and generate the timing signal in the minimum interruption period, wherein the control units can execute selectively at least one of the independent function execution mode, master function execution mode, and slave function execution mode by the programs stored in the storage means, and when one of the plurality of control units is set to the master function execution mode by execution of the program, at least one of the residual control units excluding the control unit which is set to the master function execution mode among the plurality of control units is set to the slave function execution mode for executing the slave operation by execution of the program, and the master robot controlled by the control unit set to the master function execution mode and the slave robot controlled by the control unit set to the slave function execution mode are cooperatively operated.

According to the present invention, the control units are installed respectively in the plurality of robots and the control units individually control the operations of the robots in synchronization with the timing signal generated from the timing signal generation means in the predetermined minimum interruption period. The control units are communicatably connected to each other by the communication connection means and a communication network is constructed between the control units. The control units respectively have input means, which can input teaching data necessary to perform the independent operation and cooperative operation of the robots. Further, in the storage means, a program for operating each robot in response to a predetermined operation instruction for each robot is stored, and by execution of this program, each control unit is selectively set to any of the independent function execution mode, master function execution mode, and slave function execution mode, and when one control unit is set to the master function execution mode, all of or a part of the residual control units are set to the slave function execution mode.

As mentioned above, the control units can selectively set any one of the independent function execution mode, master function execution mode, and slave function execution mode according to the program, so that among the control units, the control unit of the robot to perform the master operation, the control unit of the robot to perform the slave operation, and the control unit of the robot to perform the independent operation are described on the program as a command, thus the selected control device is set to the master execution mode for executing the master operation. Further, among the residual control units, a part of or all of the control units to perform the slave operation are selected, concretely set as a command on the program, thus the selected control device is set to the slave execution mode for executing the slave operation.

By doing this, among a series of operations executed by the robots, for the process of the cooperative operation, the robots are set to the master robot and slave robots and they communicate mutually via the communication connection means, are synchronized with high precision, thus can be operated cooperatively.

Further, it is preferable that the control unit set to the slave function execution mode changes the minimum interruption period Ts(b) of the control unit set to the slave function execution mode so as to make a communication delay time (tb−ta) from the time ta when the control unit set to the master function execution mode transmits an operation instruction to the time tb when the control unit set to the slave function execution mode receives the operation instruction and starts controlling its own robot equal to a predetermined time T.

The control unit set to the slave function execution mode changes the minimum interruption period so as to make the communication delay time (tb−ta) from the time ta when the control unit set to the master function execution mode transmits the operation instruction to the time tb when the control unit set to the slave function execution mode receives the operation instruction and starts controlling its own robot equal to the predetermined time T. As a result, the time tb when the slave side control unit starts controlling its own robot is prevented from greatly varying from the time ta when the master side control unit transmits the operation signal to the master side control unit so as to become longer or shorter than the predetermined time T. By doing this, the time variation for the operation of the slave robot from the master robot is restricted, thus the robots can be cooperatively operated precisely.

Further, the predetermined time T is preferably selected to less than the control period W of each control unit.

Since the predetermined time T is selected to less than the control period W of the control units, the time (tb−ta) from the time ta when the operation instruction is transmitted from the master side control unit to the time tb when it is received by the slave side control unit and the slave side control unit starts controlling its own robot is prevented from exceeding the control period W. By doing this, the slave side control unit surely prevents an occurrence of a fault of receiving a plurality of operation instructions from the master side control unit within the time of one control period W of the slave side control unit and the master robot and slave robot can be cooperatively operated with high precision.

Further, the control unit set to the master function execution mode preferably transmits an instruction to its own robot while being delayed by the communication delay time (tb−ta) for the control unit set to the slave function execution mode.

From transmission of the instruction from the control unit in the master function execution mode to reception of it by the control unit in the slave function execution mode, there exists the delay time (tb−ta) due to communication and operation variations are caused between the master robot and the slave robot. To prevent it, the instruction to the robot controlled by the control unit in the master function execution mode is transmitted while being delayed by the communication delay time (tb−ta) of the control unit in the slave function execution mode. Thereby, the delay of the operation of the slave robot for the master robot is prevented without changing the setting of the whole system, and the robots are synchronized with each other with high precision, thereby can be operated cooperatively.

Further, it is preferable that in the cooperative operation, when the control unit set to the slave function execution mode inputs the operation instruction from the input means, the operation instruction is input to the control unit set to the master function execution mode and the control unit set to the master function execution mode executes the control operation in response to the operation instruction input via the communication connection means.

The control unit in the slave function execution mode, when the operation instruction is input from the input means, the operation instruction is input to the control unit in the master function execution mode via the communication connection means. The control unit in the master function execution mode executes the control operation in response to the operation instruction input via the communication connection means and in this way, by input of the operation instruction from the slave side control unit, the master robot can be controlled. Therefore, an operator inputs the operation instruction not only from the master side control unit but also from the slave side control unit, can set the operation of the master robot installed in a location away from the slave robot. Accordingly, the operator can operate the whole cooperative control system from a desired location of the user, thus the operational convenience is improved.

Further, it is preferable that the control units are respectively equipped with input/output units and during the cooperative operation, in the control unit set to the master function execution mode and the control unit set to the slave function execution mode among the plurality of control units, the control unit set to the master function execution mode, via the communication connection means, inputs and outputs signals using the input/output unit of the control unit set to the slave function execution mode.

Generally, when each robot is to be independently operated, the input/output (IO) unit used to operate an external device such as an end effector is controlled by the program operated by each control unit in synchronization with the robot.

On the other hand, during the cooperative operation, by the program operated by the master control unit, the operations of both master and slave robots are controlled. In this case, the master input/output unit can be controlled by the program operated by the master control unit in synchronization with the operation of the robot. However, the slave input/output unit cannot be controlled in synchronization with the operation of the robot since the program is not operated by the slave control unit.

To solve this problem, conventionally, the peripheral device to be controlled by the slave input/output unit is controlled by the master input/output unit.

However, in this conventional method, a problem arises that the signal wire is complicated. Furthermore, when the slave robot is to be independently used, a problem arises that the input/output unit cannot be controlled only by the program of the slave control unit.

Therefore, in the present invention, in the program executed by the master control unit during the cooperative operation, a command for the input/output unit of the slave robot is described, and the command is transferred to the slave control unit by communication, and the slave control unit executes it, thereby controls the slave input/output unit. Namely, in the present invention, the operation of an external device such as an end effector connected to the robot controlled by the slave control unit is performed using the input/output (IO) unit of the slave control means. By doing this, without using the aforementioned conventional method, during the cooperative operation, the master and slave input/output units can be controlled.

Further, it is preferable that the control units respectively have an emergency stop means for stopping the cooperative operation of each control unit during the cooperative operation, and an emergency stop signal generated from any one of the emergency stop means is input to the control means equipped with the emergency stop means generating the emergency stop signal, and it is simultaneously input to the residual control means via the communication connection means to stop the operations of all the robots.

Since the control units are equipped with the emergency stop means, even when an error is generated in the robot at any location, a part of or all of the robots can be stopped in case of emergency, thus the safety is improved.

Further, it is preferable that each control unit is provided with a coordinate system of each robot, and at the tip of the arm of each robot, a positioning tool whose size is known is removably installed, and the tips of the positioning tools of the robots which are mutually neighboring are put opposite each other at least at three points so as to be arranged at the same position, thus a coordinate transformation matrix for each robot is obtained, and the cooperative operation is executed using this coordinate transformation matrix.

Since the cooperative operation is performed on the basis of a virtual frame connecting the three common points set in the master coordinate system, in each control unit, for the position and posture of each robot and additionally variations in the position and posture, the relative position of each robot can be always recognized precisely on the common coordinate system, and among the robots, even if any robot is set as a master robot and any robots are set as slave robots, the cooperative operation can be controlled in one coordinate system with high precision.

Further, in the cooperative operation, the relative position of the robot set to the slave function execution mode to the robot set to the master function execution mode is preferably interpolated so as to meet the relative position relationship at the taught operation start point and the relative position relationship at the taught operation end point.

In the relative position relationship between the master and slave robots, even if there exists a cause of variations in the relative position such as when the master robot and slave robot are shifted between the actual relative position relationship and the set relative position transformation matrix, when the tool size is in error, when the robot link length is varied, the installation accuracy itself to the reference position of each robot which is called zeroing accuracy is varied, or when by the effect of the deflection of the robot arm due to a load, even if the relative position and posture relationship is controlled so as to keep constant, the actual position and posture relationship cannot be kept constant, in addition to the robot reaching position set to the master function execution mode as mentioned above, the position of the robot set to the slave function execution mode is also taught, thus by changing the relative position and posture, the slave robot can be cooperatively operated by following the master robot. By doing this, variations in the relative position and posture of the master and slave robots are prevented from increasing in the course of time, and the relative position and posture relationship is kept with high precision, thus a predetermined operation can be executed continuously.

BRIEF DESCRIPTION OF DRAWINGS

FIG. 10 is a drawing showing an example of the cooperative operation program for cooperatively operating the master robot and slave robot in correspondence to the teaching points shown in FIG. 9.

BEST MODE FOR CARRYING OUT THE INVENTION

Figure 1:
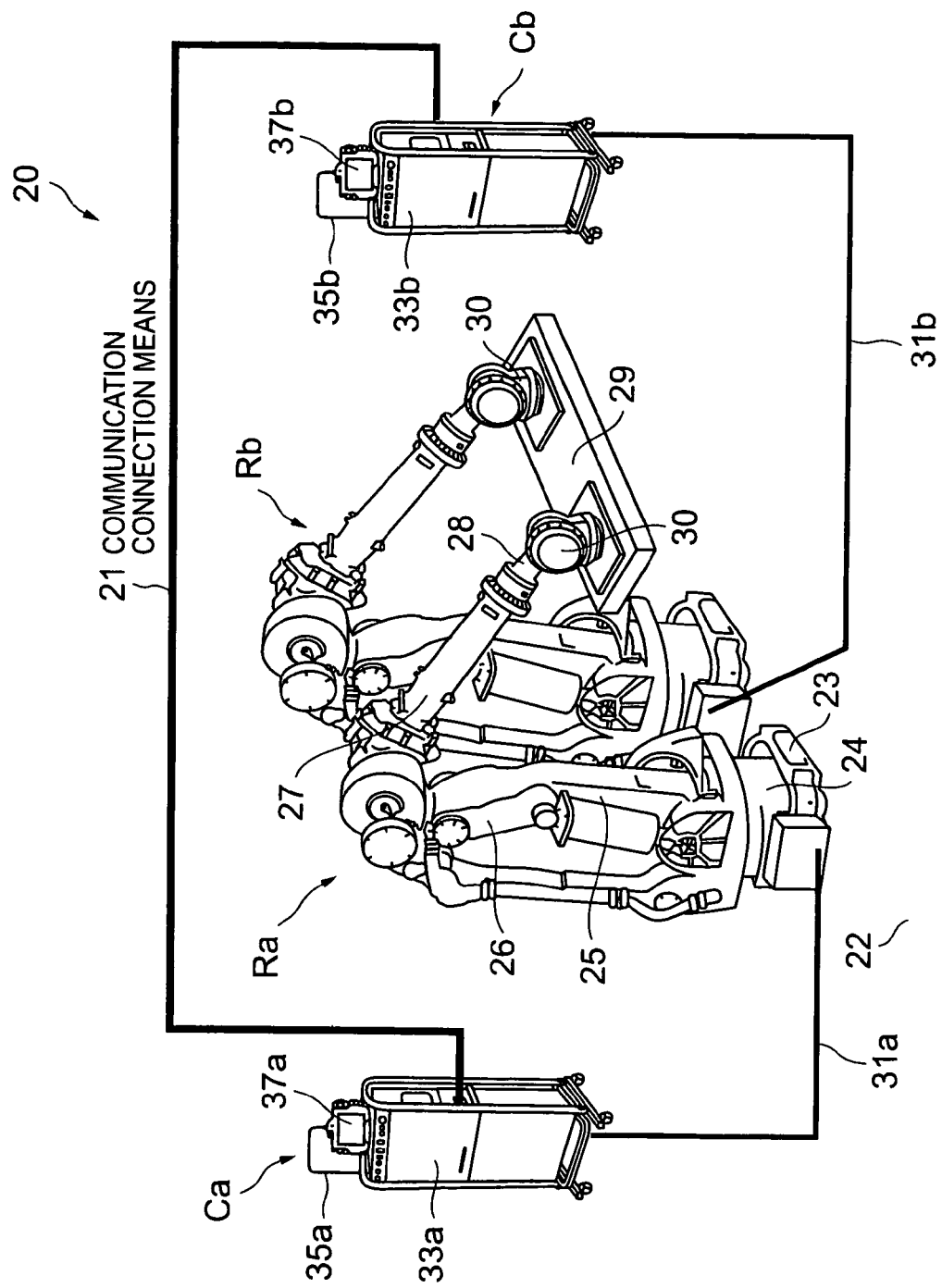
FIG. 1 is a system diagram showing the whole constitution of the robot cooperative control system 20 of an embodiment of the present invention.

The robot cooperative control system (hereinafter, may be abbreviated just to "cooperative control system") as an embodiment of the present invention shown in FIG. 1 includes a plurality of robots Ra and Rb (2 units in this embodiment), two control units Ca and Cb for independently controlling the robots Ra and Rb mutually and individually, and a communication connection means 21 for mutually connecting the control units Ca and Cb communicatably.

The robots Ra and Rb, as described as an example, are respectively realized by a 6-axis multi-joint robot in which a rotator 24 is installed on a base 23 installed on an almost horizontal floor 22 on a predetermined working stage in a factory at an interval, and on the rotator 24, a plurality of arms 25, 26, and 27 are installed angle-changeably round the axes, and a wrist 28 is installed on the tip of the arm on the free end side, and on the wrist 28, a hand 30 for removably holding a workpiece 29 is installed.

The control units Ca and Cb called robot controllers are connected to each other by the communication connection means 21, and constitute a communication network. The control units Ca and Cb have control unit bodies 33a and 33b respectively connected to the robots Ra and Tb by lines 31a and 31b and teaching input means 37a and 37b respectively connected to the control unit bodies 33a and 33b by lines 35a and 35b.

The communication connection means 21 is realized, for example, by Ethernet. In this embodiment, Ethernet is referred to as a LAN (local area network) which is standardized as IEEE802.3 and ISO8802-3 by the USA Institute of Electrical and Electronic Engineers (abbreviated to IEEE) and International Organization for Standardization (abbreviated to IOS).

Figure 2:
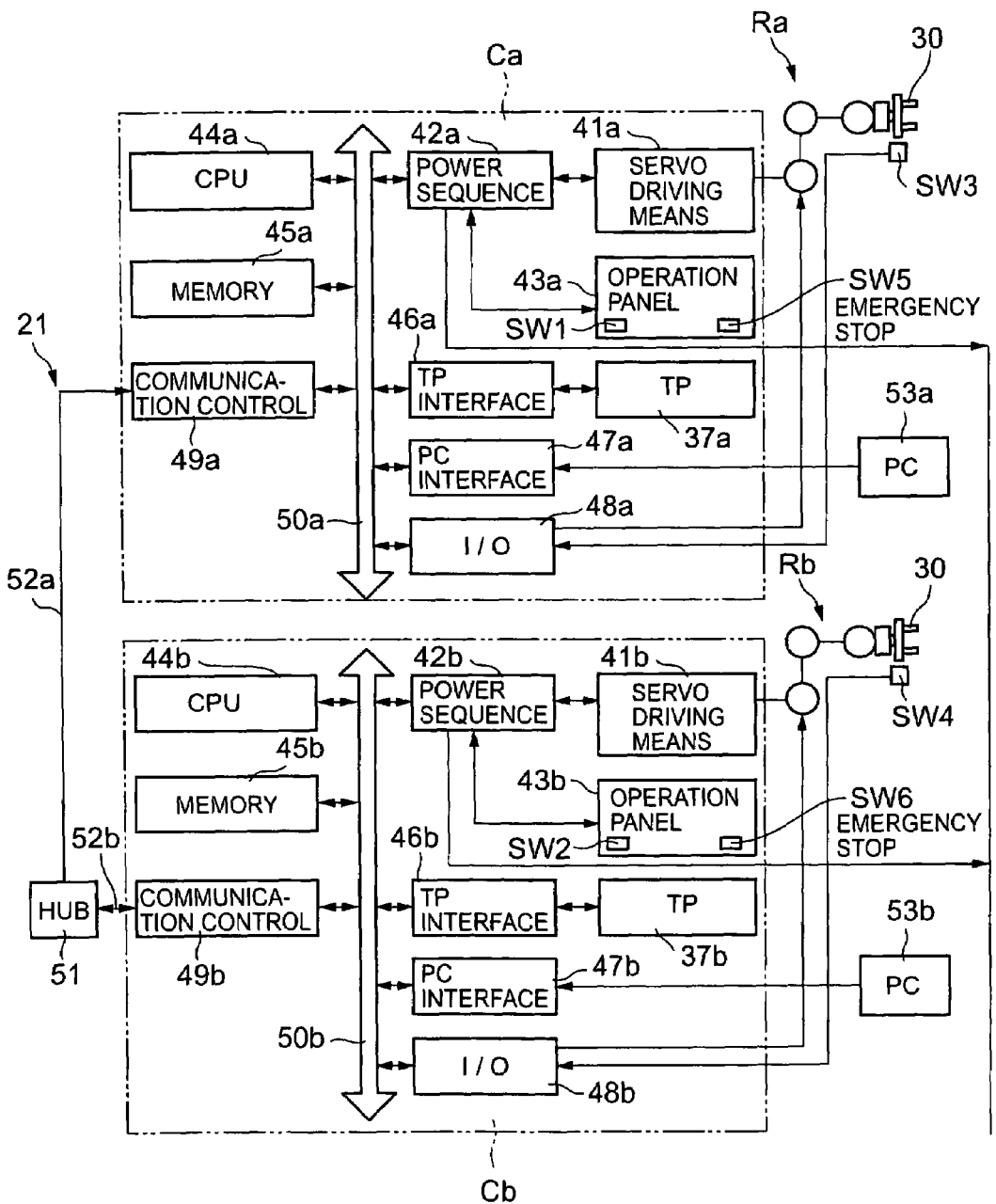
FIG. 2 is a block diagram showing the constitution of the control units Ca and Cb.

FIG. 2 is a block diagram showing the constitution of the control units Ca and Cb. The control units Ca and Cb include servo driving means 41a and 41b respectively installed on the robots Ra and Rb for driving servo motors not shown in the drawing, power sequence circuits 42a and 42b, operation panels 43a and 43b for inputting an operation instruction to the robots Ra and Rb, control means 44a and 44b realized by a central processing unit (abbreviated to CPU), memories 45a and 45b, the aforementioned teaching input means 37a and 37b, interface circuits 46a and 46b for the teaching input means, interface circuits for personal computers 47a and 47b (hereinafter, abbreviated to "PC interface circuits"), signal input/output circuits 48a and 48b, and communication control means 49a and 49b. To the interface circuits 47a and 47b for remote control units, personal computers (hereinafter, may be abbreviated to "PC") 53a and 53b are connected.

The power sequence circuits 42a and 42b, the memories 45a and 45b, the interface circuits 46a and 46b for the teaching input means, the interface circuits 47a and 47b for PCs, the signal input/output circuits 48a and 48b, and the communication control means 49a and 49b are mutually connected by bus lines 50a and 50b. On the operation panels 43a and 43b, stop switches SW1 and SW2 for inputting a stop instruction for stopping the operation of the robots Ra and Rb and emergency stop switches SW5 and SW6 are installed. Further, to the signal input/output circuits 48a and 48b, hand On-Off detection switches SW3 and SW4 are connected.

The communication connection means 21 includes a hub 51, the communication control means 49a and 49b installed on the control units Ca and Cb, and communication cables 52a and 52b. The communication cables 52a and 52b respectively connect the communication control means 49a and 49b and the hub 51 to form a communication network.

Figure 3:
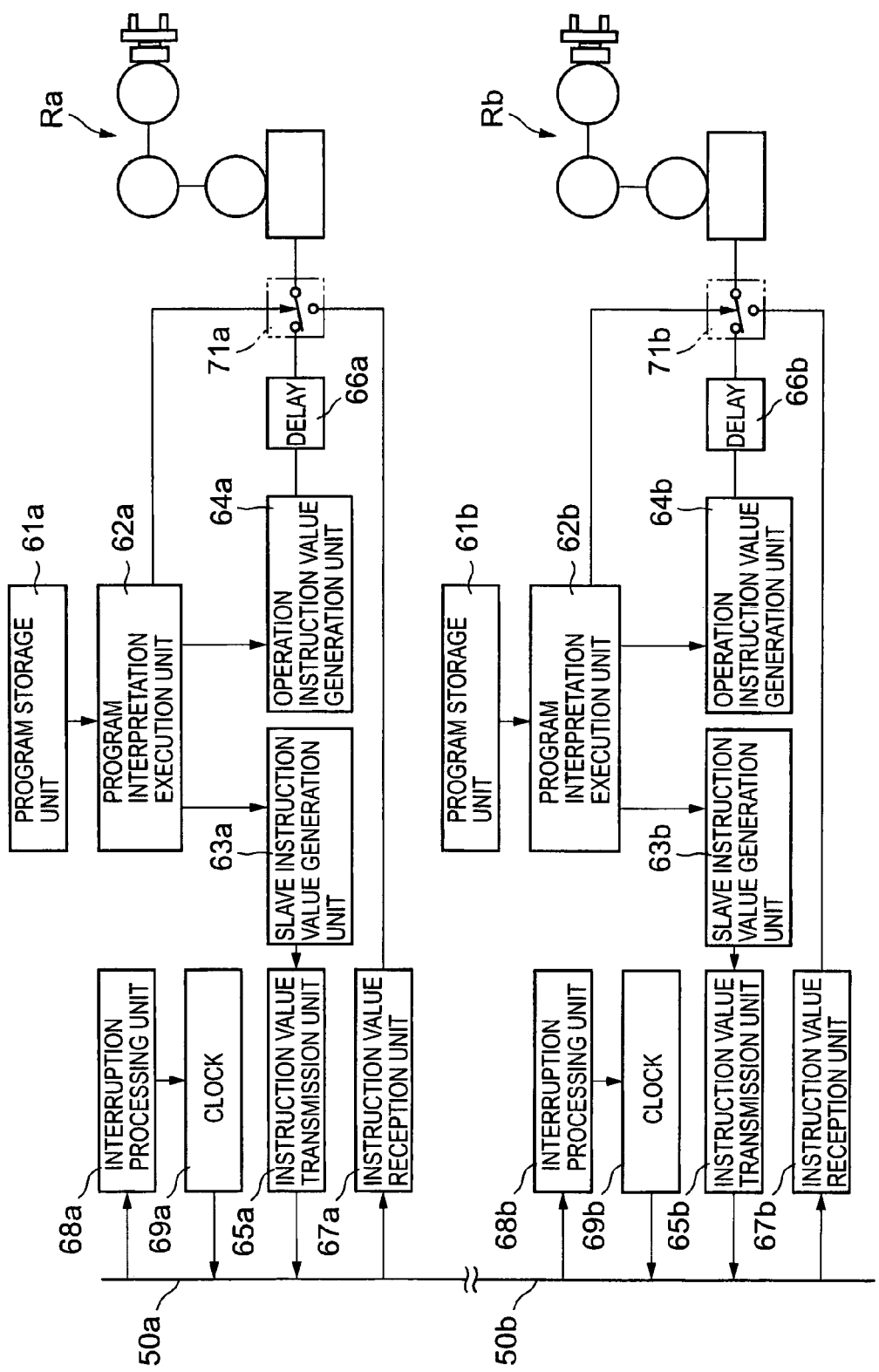
FIG. 3 is a block diagram showing the constitution on the software of the control units Ca and Cb.

FIG. 3 is a block diagram showing the constitution on the software of the control units Ca and Cb. The control units Ca and Cb, to execute the programs respectively stored in the memories 45a and 45b, include program storage units 61a and 61b, program execution and interpretation units 62a and 62b, slave instruction value generation units 63a and 73b, operation instruction value generation units 64a and 64b, instruction value transmission units 65a and 65b, instruction value delay units 66a and 66b, instruction value reception units 67a and 67b, interruption processing units 68a and 68b, clock generation units 69a and 69b, and signal path switching units 71a and 71b.

The control units Ca and Cb are respectively set to any of the independent function execution mode, master function execution mode, and slave function execution mode by the programs stored in the memories 45a and 45b and when either of the two control units Ca and Cb is set to the master function execution mode, the other of the two control units Ca and Cb is set to the slave function execution mode, thus the robots Ra and Rb controlled by the control units Ca and Cb can be cooperatively operated.

Figure 4:
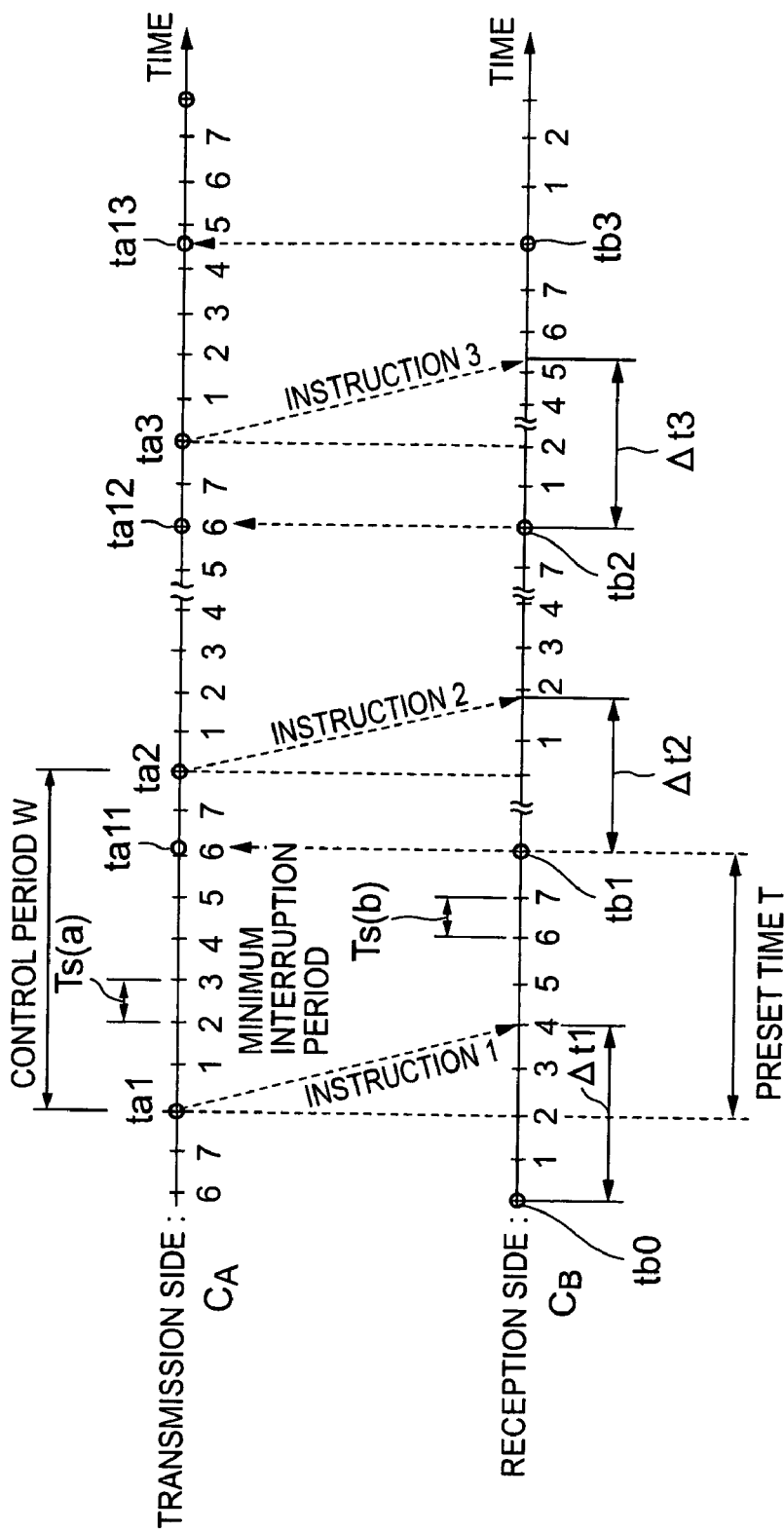
FIG. 4 is a simplified block diagram showing the constitution of the software program for synchronizing the control units Ca and Cb.

FIG. 4 is a drawing for explaining the synchronizing function of the control units Ca and Cb. The control units Ca and Cb have a similar synchronizing function and for convenience, in the following explanation, the control unit Ca on one side set to the master function execution mode is assumed as a transmission side and the control unit Cb on the other side set to the slave function execution mode is assumed as a reception side. An instruction signal transmitted from the control unit Ca on one side at each time of ta1, ta2, ta3, . . . is received by the control unit Cb on the other side via the communication connection means 21 in time series at each time of (tb0+Δt1), (tb1+Δt2), (tb2+Δt3), . . . after a lapse of a predetermined time of Δt1, Δt2, Δt3, . . . from the preceding control time of tb0, tb1, tb2, . . . to the slave robot Rb.

In this transmission of the operation instruction from the master side control unit Ca to the slave side control unit Cb via the communication connection means 21, there exist a first communication delay time of the reception time of (tb0+Δt1), (tb1+Δt2), (tb2+Δt3), . . . from the transmission time of ta1, ta2, ta3, . . . caused by a fine error of the oscillation frequency due to the individual difference between the crystal oscillators built in the control means 44a and 44b (abbreviated to CPU) of the control units Ca and Cb and a second communication delay time by the communication delay time due to via the communication connection means 21 and by a time lag from the reception time of (tb0+Δt1), (tb1+Δt2), (tb2+Δt3), . . . of the operation instructions 1, 2, 3, . . . from the master side control unit Ca by the slave side control unit Cb to the control time of tb1, tb2, tb3, . . . for starting the control of the slave robot Rb. Therefore, variations of the operation of the master robot Rb controlled by the control unit Cb on the other side from the operation of the master robot Ra controlled by the control unit Ca on one side are caused and the variations of the relative position between the robots Ra and Rb at the same time cannot be ignored from the viewpoint of working accuracy.

With respect to the first communication delay time, in FIG. 4, when the master side (transmission side) control unit Ca transmits the instruction 1 at the transmission time ta1, the transmitted instruction 1 is received by the slave side (reception side) control unit Cb at the reception time (tb0+Δt1). The reception time (tb0+Δt1) is the time when a predetermined time of Δt1 elapses from the preceding control time tb0 for the robot Rb to be controlled by the slave side control unit Cb and the instruction 1 is received at the oscillation time of the timing signal at the fourth count of the minimum interruption period Ts (b) of the slave side control unit Cb.

Next, at the time ta2 after lapse of one control period, the master side control unit Ca transmits the instruction 2 and the instruction 2 is received by the slave side control unit Cb at the next reception time (tb1+Δt2). However, as mentioned above, between the crystal oscillator built in the control means 44b of the slave side control unit Cb and the crystal oscillator built in the control means 44a of the master side control unit Ca, there exists a fine error of the oscillation frequency due to the individual difference between the crystal oscillators for each CPU, so that the instruction 2 reaching between the first count and the second count of the minimum interruption period Ts (b) is received at the time (tb1+Δt2) at the second count from the preceding control time tb1. When the instruction 2 is received at less than the third count of the timing signal from the preceding control time tb1 like this, the reception side control unit Cb shortens its own minimum interruption period Ts(b) to control the reception time (tb1+Δt2) between the third count and the fifth count.

Further, the instruction 3 transmitted at the time ta3 by the master side control unit Ca reaches the slave side control unit Cb between the fifth count and the sixth count from the preceding control time tb2, so that the instruction 3 is received at the sixth count and the slave side control unit Cb controls the slave robot Rb at the control time tb3. Therefore, the slave side control unit Cb prolongs its own minimum interruption period Ts (b) and controls the reception time (tb2+Δt3) to be set between the third count and the fifth count from the preceding control time tb2.

By doing this, the time (tb1−ta0), (tb2−ta1), (tb3−ta2), . . . from the time of ta1, ta2, ta3, . . . when the instructions 1, 2, 3, . . . are transmitted from the master side control unit Ca to the time tb1, tb2, tb3, . . . when the instructions are received by the slave side control unit Cb and the slave side control unit Cb starts controlling its own robot Ra is prevented from exceeding the control period W of the slave side control unit Cb. By doing this, the slave side control unit Cb receives a plurality of operation instructions from the master side control unit Ca within one control period W of the slave side control unit Cb, or an occurrence of a failure that the operation instructions are not received within one control period W is surely prevented, and the master robot and slave robot can be operated cooperatively with high precision.

Furthermore, to perfectly synchronize the master side control unit Ca with the slave side control unit Cb, it is necessary to cancel the second communication delay time by the communication delay time due to via the communication connection means 21 and by the time lag from the reception time of (tb0+Δt1), (tb1+Δt2), (tb2+Δt3), . . . of the operation instructions 1, 2, 3, . . . from the master side control unit Ca by the slave side control unit Cb to the control time of tb1, tb2, tb3, . . . for starting the control of the slave robot Rb. Therefore, to cancel the first communication delay, when the n times of the minimum interruption period Ts(b) of the slave side (or reception side) control unit Cb controlled as mentioned above is equivalent to the control period W, the master side control time of ta11, ta12, ta13, . . . must coincide with the slave side control time of tb1, tb2, tb3, . . . . Therefore, the master side control unit Ca, by the instruction value delay unit 66a, delays the control time of ta11, ta12, ta13, ... to its own robot Ra generated by the operation instruction value generation unit 64a by a predetermined time T from the transmission time ta1, ta2, ta3, ...

Figure 5:
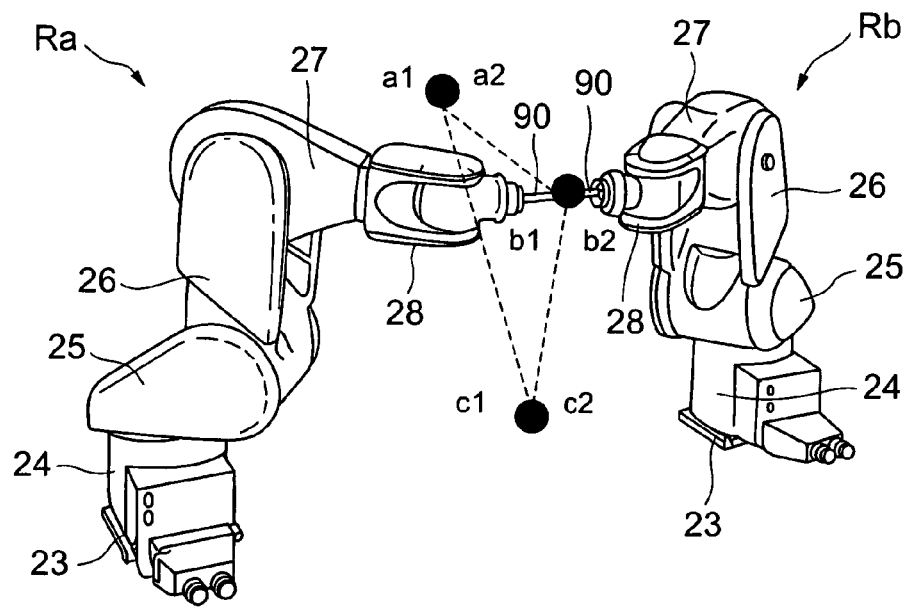
FIG. 5 is a drawing for explaining the procedure of measuring and setting the relative position between the robots Ra and Rb.
Figure 6:
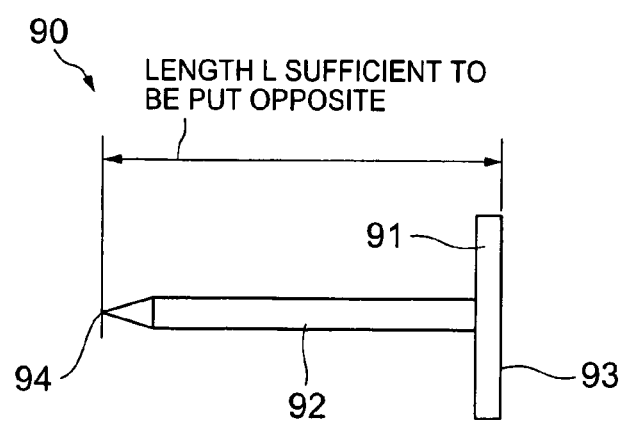
FIG. 6 is a side view showing the facing tool 90 used to measure and set the relative position between the robots Ra and Rb.

FIG. 5 is a drawing for explaining the procedure of measuring and setting the relative position between the robots Ra and Rb and FIG. 6 is a side view showing the facing tool 90 used to measure and set the relative position between the robots Ra and Rb. To cooperatively operate the robots Ra and Rb by maintaining the relative position relationship between the robots Ra and Rb, it is necessary to measure the relative position relationship between the robots Ra and Rb and register the data in both the control units Ca and Cb and the procedure will be explained below.

To measure and set the relative position between the robots Ra and Rb, on the wrists 28 of the robots Ra and Rb, the facing tools 90 shown in FIG. 6 are respectively installed. Each facing tool 90 has a circular flange 91 removably attached to the wrist 28 by a screw member such as a bolt and a rod 92 having a circular section which is fixed perpendicularly onto the center axial line of the flange 91. The tip of the rod 92 is formed in a tapered shape and more concretely, formed in a conical shape.

In each facing tool 90, the length L from a surface 93 in contact with the wrist 28 of the flange 91 to a tip 94 of the rod 92 must be found accurately. The length L is selected as a length between which the robots Ra and Rb can be put opposite each other. Further, the facing tool 90 is structured so as to fix the rod 92 to the circular flange 91 perpendicularly to the center axial line, so that when the tips 94 are put opposite each other, the other parts are not interfered with each other and are prevented from interfering with the circumference. Furthermore, the tips 94 of the rods 92 are tapered, so that they can be easily put opposite each other, and in the state that they are put opposite each other, they are not easily shifted, and in the shifted state, they enter the no-contact state, and the state is clearly recognized, thus they can be precisely put opposite each other.

Figure 7:
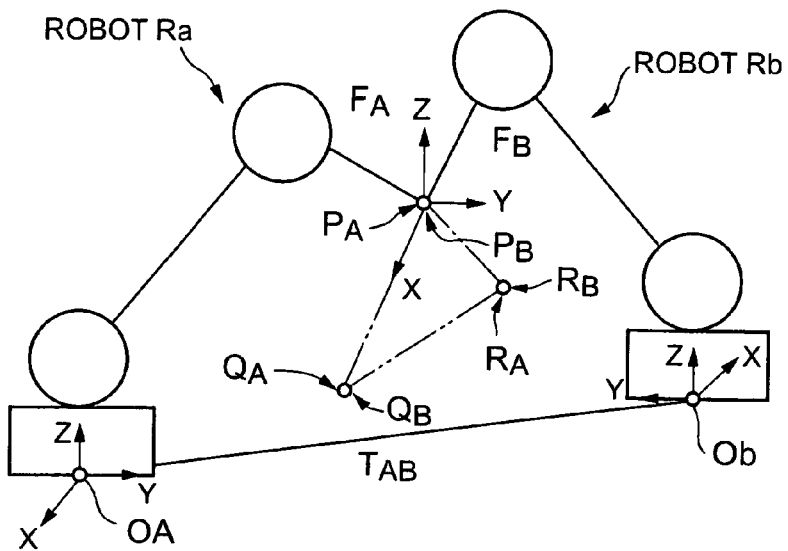
FIG. 7 is a drawing for explaining the calibration procedure for the coordinate system between the robots Ra and Rb by putting three points opposite each other.

FIG. 7 is a drawing for explaining the calibration procedure for the coordinate system between the robots Ra and Rb by putting three points opposite each other. A calculation method for the relative position between the robots Ra and Rb which are put opposite each other at three points will be explained below. The base coordinate system ΣBaseB concerning the origin Ob of the robot Rb on the other side is defined as a transformation matrix $T_{AB}$ for transforming to the base coordinate systemΣBaseA of the robot Ra on one side. Here, the transformation matrix $T_{AB}$ is assumed as the following concurrent transformation matrix.

$$T_{AB} = \begin{bmatrix} n & o & a & p \\ 0 & 0 & 0 & 1 \end{bmatrix} = \begin{bmatrix} n_1 & o_1 & a_1 & p_1 \\ n_2 & o_2 & a_2 & p_2 \\ n_3 & o_3 & a_3 & p_3 \\ 0 & 0 & 0 & 1 \end{bmatrix} \quad (1)$$

On a straight line, optional three points are put opposite each other and the position at the tool tip point of the robot Ra in the base coordinate systemΣBaseA of the robot Ra which is obtained by the above operation and the position at the tool tip point of the robot Rb in the base coordinate systemΣBaseB of the robot Rb are assumed respectively as points ($P_A$, $P_B$), point ($Q_A$, $Q_B$), and point ($R_A$, $R_B$).

Next, the point $P_A$ is assumed as an origin, and the line segment extending from the point $P_A$ to the point $Q_A$ is assumed as a positive direction of the axis X, and the frame in the base coordinate systemΣBaseA of the robot Ra including the point $R_A$ in the plane XY (Y>0) is assumed as $F_A$.

$$F_A = \begin{bmatrix} n_A & o_A & a_A & p_A \\ 0 & 0 & 0 & 1 \end{bmatrix} \quad (2)$$

where:

$$n_A = \overrightarrow{Q_A Q_A} - \overrightarrow{P_A Q_A} / |\overrightarrow{Q_A Q_A} - \overrightarrow{P_A O_A}| \quad \text{(unit vector)} \quad (3)$$

$$a_A = n_A \times (\overrightarrow{R_A O_A} - \overrightarrow{P_A O_A}) / |n_A \times (\overrightarrow{R_A O_A} - \overrightarrow{P_A O_A})| \quad \text{(unit vector)} \quad (4)$$

$$O_A = a_A \times n_A \quad (5)$$

$$p_A = \overrightarrow{P_A O_A} \quad (6)$$

Similarly, the point $P_B$ is assumed as an origin, and the line segment extending from the point PB to the point $Q_B$ is assumed as a positive direction of the axis X, and the frame in the base coordinate systemΣBaseA of the robot Ra including the point $R_B$ in the plane XY (Y>0) is assumed as $F_B$.

$$F_B = \begin{bmatrix} n_B & o_B & a_B & p_B \\ 0 & 0 & 0 & 1 \end{bmatrix} \quad (7)$$

where:

$$n_B = \overrightarrow{Q_B O_B} - \overrightarrow{P_B Q_B} / |\overrightarrow{Q_B O_B} - \overrightarrow{P_B O_B}| \quad \text{(unit vector)} \quad (8)$$

$$a_B = n_B \times (\overrightarrow{R_B O_B} - \overrightarrow{P_B O_B}) / |n_B \times (\overrightarrow{R_B O_B} - \overrightarrow{P_B O_B})| \quad \text{(unit vector)} \quad (9)$$

$$O_B = a_B \times n_B \quad (10)$$

$$p_B = \overrightarrow{P_B O_B} \quad (11)$$

At this time, the following formula is held between the frames $F_A$ and $F_B$ and the transformation matrix $T_{AB}$.

$$F_A = T_{AB} F_B \quad (12)$$

Therefore, the transformation matrix $T_{AB}$ is obtained by the following formula.

$$T_{AB} = F_A \cdot F_B^{-1} \quad (13)$$

This transformation matrix $T_{AB}$ is described in the programs stored in the memories 45a and 45b of the control units Ca and Cb as a function for performing the coordinate transformation from the self (accompanying character A) to the opposite (accompanying character B).

Figure 8:
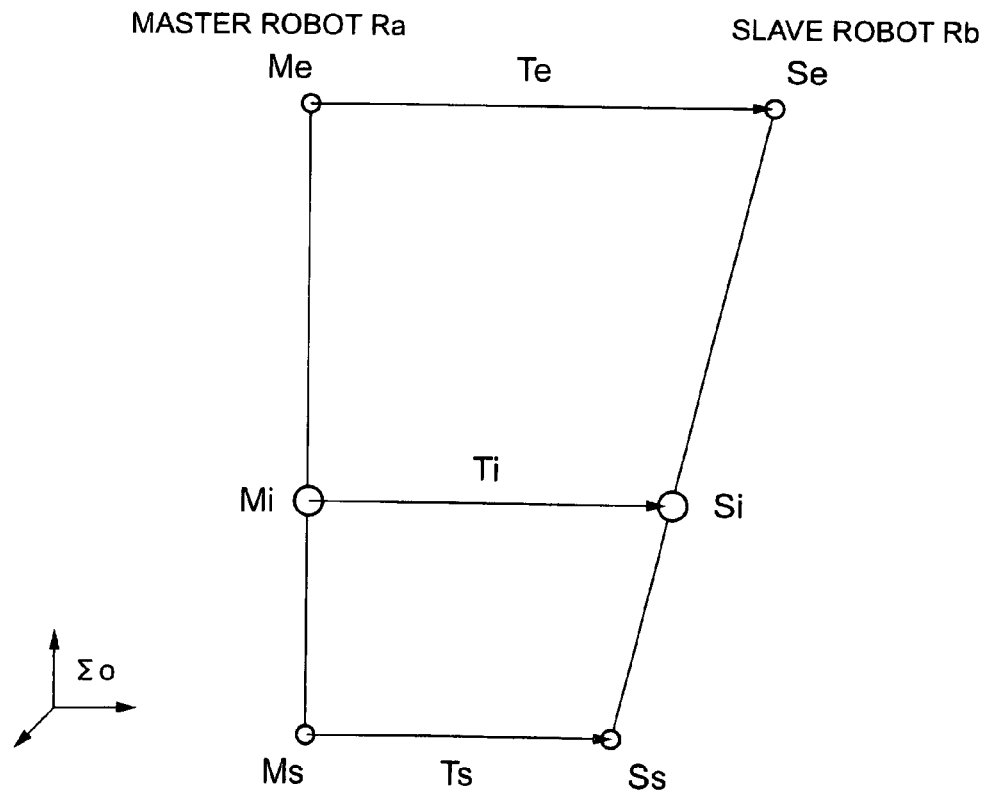
FIG. 8 is a drawing for explaining the calculation method for the operation halfway point Si of the slave robot corresponding to the operation halfway point Mi of the master robot.

FIG. 8 is a drawing for explaining the calculation method for the operation halfway point Si of the slave robot corresponding to the operation halfway point Mi of the master robot. Firstly, when the robot Ra on one side is assumed as a master robot and the robot Rb on the other side is assumed as a slave robot, it is assumed that in the common coordinate system Σ0 of the master robot and slave robot, the operation start point of the master robot Ra is taught at Ms and the operation end point is taught at Me and in the common coordinate system Σ0, the operation start point of the slave robot Rb is taught at Ss and the operation end point is taught at Se. When the master robot Ra moves from the teaching point Ms to the teaching point Me, the operation intermediate point Si of the robot Rb corresponding to the operation intermediate point Mi of the master robot Ra is obtained.

The operation halfway point Mi of the master robot Ra is obtained using the parameter s. The value of the parameter s is assumed that when S=1, the master robot Ra reaches the operation start point Ms and when S=0.0, the master robot Ra reaches the operation end point Me. Further, the parameter s when the master robot Ra is at the operation halfway point Mi is indicated by si and the operation halfway point of the slave robot Rb at this time is assumed as Si. The transformation matrix from the operation start point Ms of the master robot Ra to the operation start point Ss of the slave robot Rb is assumed as $T_{AB}(s)$, and the transformation matrix from the operation end point Me of the master robot Ra to the operation end point of the slave robot Rb is assumed as $T_{AB}(e)$, and they are expressed by the following formulas.

$$T_{AB}(s) = Ss \cdot Ms^{-1} \qquad (14)$$

$$T_{AB}(e) = Se \cdot Me^{-1} \qquad (15)$$

Further, when the transformation matrixes $T_{AB}(s)$ and $T_{AB}(e)$ are to be expressed by an XYZ Euler angle, $T_{AB}(s)$ is assumed as (Xs, Ys, Zs, Os, As, Ts), and $T_{AB}(e)$ is assumed as (Xe, Ye, Ze, Oe, Ae, Te), and the Euler angle expressions of the transformation matrix Ti for the operation halfway point Mi of the master robot Ra are obtained from the following formulas.

$$Xi = Xe - (Xe - Xs) \cdot s \qquad (16)$$

$$Yi = Ye - (Ye - Ys) \cdot s \qquad (17)$$

$$Zi = Ze - (Ze - Zs) \cdot s \qquad (18)$$

$$Oi = Oe - (Oe - Os) \cdot s \qquad (19)$$

$$Ai = Ae - (Ae - As) \cdot s \qquad (20)$$

$$Ti = Te - (Te - Ts) \cdot s \qquad (21)$$

These formulas 14 to 19 are expressed as transformation matrix Ti and the operation halfway point Si of the slave robot Rb for the operation halfway point Mi of the master robot Ra is obtained by the following formula.

$$Si = Ti \cdot Mi \qquad (22)$$

Such a relational formula of the operation halfway point Si of the slave robot Rb for the operation halfway point Mi of the master robot Ra is stored in the memories 45$a$ and 45$b$ of the control units Ca and Cb as a program and as described later, the system is structured so as to optionally set a master robot and a slave robot among the robots Ra and Rb and cooperatively operate them.

Figure 9:
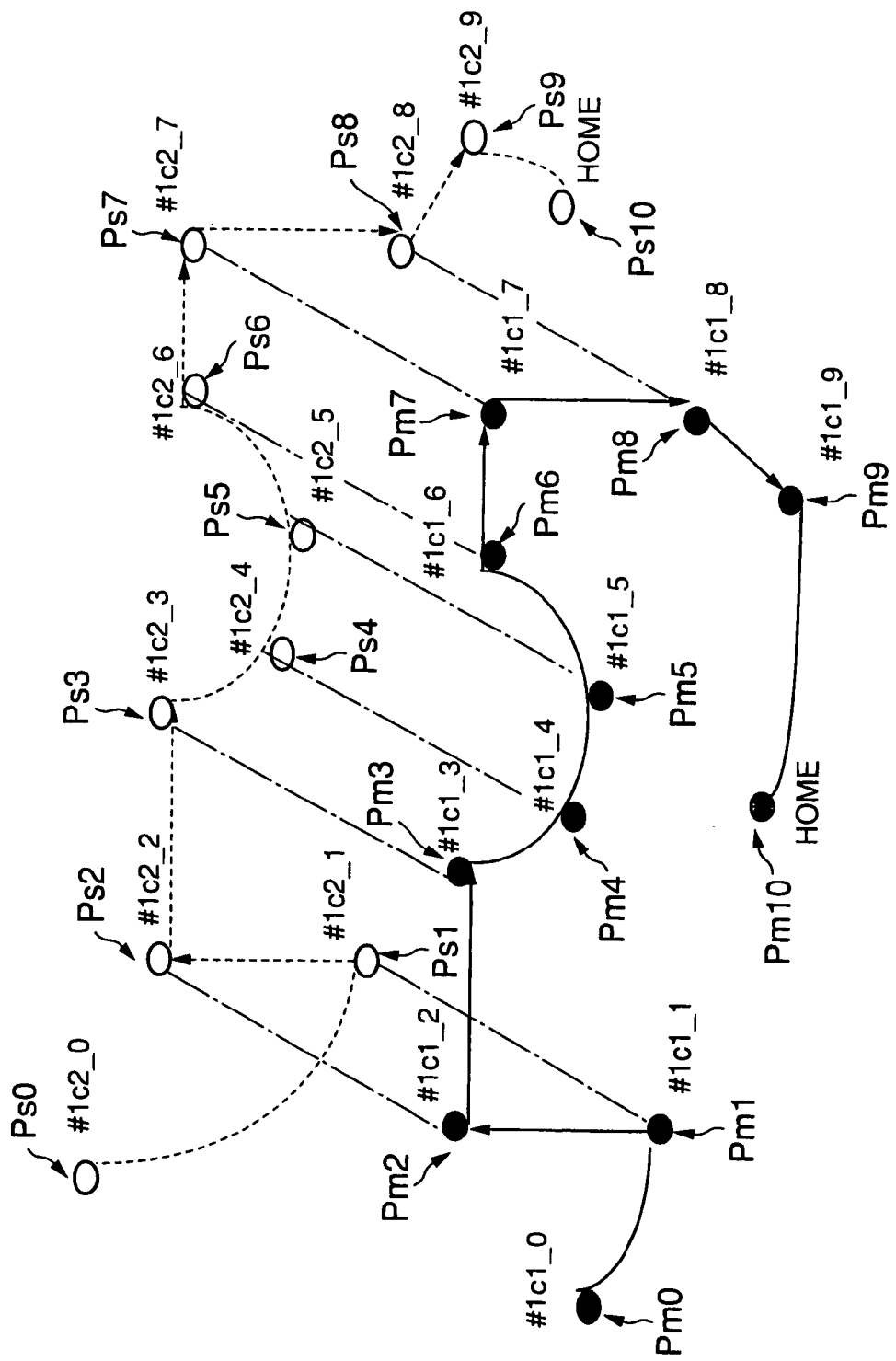
FIG. 9 is a perspective view showing the movement paths of the tips 94a and 94b of the arms of the robots Ra and Rb for explaining the teaching procedure for the cooperative operation parts.
Figure 11:
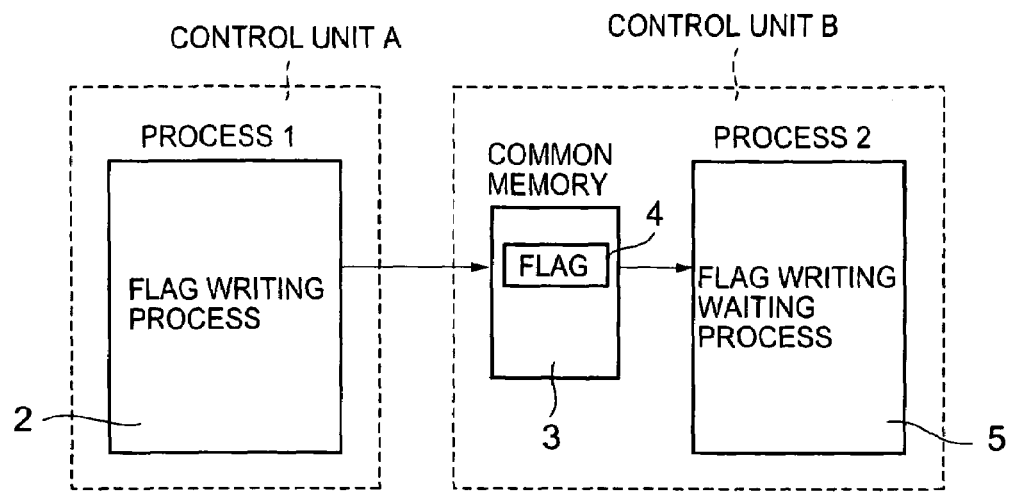
FIG. 11 is a block diagram showing a part of the constitution on the software program for synchronizing the control units of the master robot and slave robot of the robot cooperative control system of the conventional art.
Figure 12:
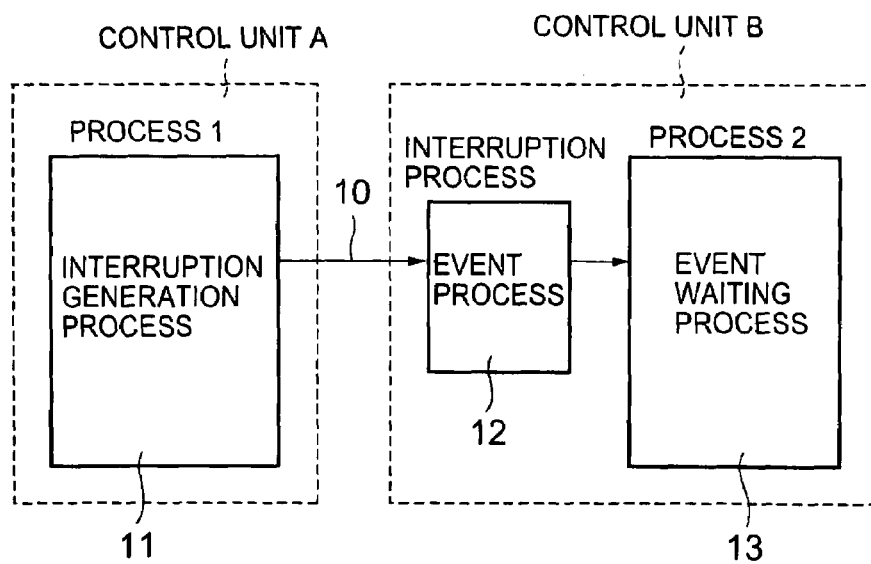
FIG. 12 is a block diagram for explaining the method on the software program for synchronizing the control units by the interruption method used in the cooperative control system of another conventional art.

FIG. 9 is a perspective view showing the movement paths of the tips 94$a$ and 94$b$ of the arms of the robots Ra and Rb for explaining the teaching procedure for the cooperative operation parts. In the drawing, the solid lines indicate the movement paths of the tip 94$a$ of the arm of the master robot and the dashed lines indicate the movement paths of the tip 94$b$ of the arm of the slave robot. FIG. 10 is a drawing showing an example of the cooperative operation program for cooperatively operating the master robot and slave robot in correspondence to the teaching points shown in FIG. 9.

Next, the programs for the respective cooperative operations are prepared and the positions thereof are taught. The programs to be prepared include the program ".PROGRAM master( )" executed by the robot Ra on one side and the program ".PROGRAM slave( )" executed by the robot Rb on the other side.

The program ".PROGRAM master( )" set in the robot Ra on one side has 1 to 20 steps and the system is structured as indicated below so that the operations from the operation target position Pm0 to the operation end position Pa10 via the target positions Pm1 to Pm9 which are indicated by the solid lines are performed by the robot Ra on one side.

Firstly, Step 1 is an operation command for moving the axes of the robot Ra on one side to the operation start position Pm0 and "JMOVE #1c1#0" is input. "JOMVE" indicates a command for moving the robot to the designated target position in the interpolation operation of each axis. "#1c1#0" indicates a variable name instructing the operation target position Pm0.

Step 2 is a command for moving the robot Ra on one side from the operation start position Pm0 to the next target position Pm1 and "JMOVE #1c1#1" is input. "JMOVE" indicates a reserved word for instructing the linear operation and "#1c1#1" indicates a variable name instructing the operation target position Pm1.

Step 3 is a command for closing the hand 30 at the position Pm1 designated at Step 2 and "CLOSE" is described. The aforementioned is the program of the independent operation of the master robot Ra.

Next, Step 4 is a command for declaring the cooperative operation and "MASTER" is described. By this command, the robot Ra on one side is set to a master robot, and slave is declared by the robot Rb on the other side, and the cooperative operation is started. The control unit Ca in the master function execution mode transmits the instruction and until the control unit Cb in the slave function execution mode receives it, a delay due to communication is caused. However, the minimum interruption period Ts(b) of the control unit Cb in the slave function execution mode, when the instruction from the control unit Ca in the master function execution mode is input to the control unit Cb in the slave function execution mode, for example, within the third count as mentioned above, is shortened, and when it is input more than the fifth count, the minimum interruption period Ts (b) is prolonged, and the instruction is transmitted while being delayed from the control time ta11, ta12, ta13, . . . to the own master robot Ra of the control unit Ca in the master function execution mode by a predetermined time T, thus the operation of the slave robot Rb for the master robot Ra is prevented from being delayed, and the robots are synchronized with each other with high precision, and the cooperative operation can be performed.

Step 5 is a command for closing the hand 30 of the master robot Ra and "SIGNAL 2" is described.

Step 6 is a command for closing the hand 30 of the slave robot Rb and "SIGNAL 2:2" is described.

Step 7 is a command for cooperatively operating the robots Ra and Rb and moving them to the next target positions Pm2 and Ps2 and "MLLMOVE #1c2#2, #1c2#2" is described.

Step 8 is a command for moving the robots Ra and Rb to the next target positions Pm3 and Ps3 and "MLLMOVE #1c1#3, #1c2#3" is described.

Step 9 is a command for waiting the master robot Ra until it satisfies the next instruction and "SWAIT 1001" is described.

Step 10 is a command for waiting the slave robot Rb until the next instruction is input to the input/output circuit 48$b$ and "SWAI 2:1001" is described.

Step 11 is a command for moving the robots Ra and Rb to the next target positions Pm4 and Ps4 and "MLC1MOVE #1c1#4, #1c2#4" is described.

Step 12 is a command for moving the robots Ra and Rb to the next target positions Pm5 and Ps5 and "MLC1MOVE #1c1#5, #1c2#5" is described.

Step 13 is a command for moving the robots Ra and Rb to the next target positions Pm6 and Ps6 and "MLC2MOVE #1c1#6, #1c2#6" is described.

Step 14 is a command for moving the robots Ra and Rb to the next target positions Pm7 and Ps7 and "MLLMOVE #1c1#7, #1c2#7" is described.

Step 15 is a command for moving the robots Ra and Rb to the next target positions Pm8 and Ps8 and "MLLMOVE #1c1#8, #1c2#8" is described.

Step 16 is a command for canceling the cooperative operation of the master robot Ra and "ALONE" is described.

Step 17 is a command for opening the hand 30 of the robot Ra on one side and "OPEN" is described.

Step 18 is a command for waiting the robot Ra on one side until the timer satisfies the state instructed by a variable name of "1002" and "SWAIT 1002" is described.

Step 19 is a command for linearly moving the robot Ra on one side to the target position Pm9 instructed by a variable name of "#1c1#9" and "LMOVE #1c1#9" is described.

Step 20 is a command for moving the robot Ra on one side to the operation end position Pm10 and "HOME" is described.

Next, the program set to the robot Rb on the other side will be explained. The program ".PROGRAM slave( )" for the robot Rb on the other side has 1 to 10 steps and the system is structured as indicated below so that the operations from the operation target position Ps0 to the operation end position Ps10 via the target positions Ps1 to Ps9 which are indicated by the dashed lines are performed by the slave robot Rb.

Firstly, Step 1 is an operation command for moving the axes of the robot Rb on the other side to the operation target position Ps0 and "JMOVE #1c1#0" is input. "JOMVE" indicates a command for moving the robot to the designated position in the interpolation operation. "#1c1#0" indicates coordinates of the operation target position Ps0.

Step 2 is a command for moving the robot Rb on the other side from the operation start position Ps0 to the next position Ps1 and "JMOVE #1c1#1" is described. "JMOVE" indicates a linear operation command and "#1c1#1" indicates coordinates of the next position Ps1.

Step 3 is a command for closing the hand 30 at the position Ps1 designated at Step 2 and "CLOSE" is described. The aforementioned is the program of the independent operation of the slave robot.

Next, Step 4 is a command for waiting the robot Rb on the other side until it satisfies the condition instructed by a variable name of "1002" and "SWAIT 1002" is described.

Step 5 is a command for declaring that the robot operates as a slave robot and "SLAVE" is described. At the time of execution of this program, the slave robot Rb performs the cooperative operation in response to the commands at Steps 5 to 15 from the master robot Ra. During the cooperative operation, as mentioned above, the robot Rb on the other side is connected to the robot Ra on one side by the network communication connection means 21, so that the robots Ra and Rb can be precisely synchronized with each other and cooperatively operated by correcting variations in the control period.

Step 6 is a command for declaring that the cooperative operation is canceled and the operation is returned to the independent operation and "ALONE" is described.

Step 7 is a command for opening the hand 30 of the robot Rb on the other side and "OPEN" is described.

Step 8 is a command for setting individually instructions for both the master robot Ra and slave robot Rb and "SIGNAL 2" is described.

Step 9 is a command for moving the robot Rb on the other side to the target position Ps9 instructed by a variable name of "#1c2#9" and "LMOVE #1c2#9" is described.

Step 10 is a command for moving the robot Rb on the other side to the operation end position Ps10 and "HOME" is described.

Among a series of operations executed by the robots in this way, with respect to the process of the cooperative operation, the robots are respectively set to a master robot and a slave robot, mutually communicated via the communication connection means, synchronized with each other with high precision, thereby can be operated cooperatively.

Further, when the control unit Cb in the slave function execution mode inputs an operation instruction from the input means, the operation instruction is input to the control unit Ca in the master function execution mode via the communication connection means. The control unit Ca in the master function execution mode executes the control operation in response to the input operation instruction, thus by input of the operation instruction from the slave side control unit Cb, the master robot Ra can be controlled. Therefore, an operator inputs the operation instruction not only from the master side control unit Ca but also from the slave side control unit Cb, can set the operation of the master robot Ra installed in a location away from the slave robot Rb, thereby can operate the whole cooperative control system from a location desired by him, thus the operational convenience is improved.

Furthermore, an external device such as an end effector connected to the robot Ra controlled by the control unit Cb in the slave function execution mode is operated using the input/output (IO) circuit of the control unit Cb set to the slave function execution mode. The cooperative operation is performed by the operation command of the program stored in the memory 45*a* on the master robot side, so that the external device connected to the slave robot Rb is controlled using the input/output circuit 48*a* installed in the control unit Ca of the master robot Ra, thus the signal wiring is complicated, and when the slave robot Rb is to be used independently, it is affected by a signal of the master robot Ra. Such a failure, when the master robot Ra uses the input/output circuit 48*a* of the control unit Cb on the slave side as mentioned above, can be avoided.

In the aforementioned embodiment, the constitution that the two control units Ca and Cb individually installed in the two robots Ra and Rb are connected by the communication connection means 21 is described. However, in another embodiment of the present invention, even to a constitution that control units individually installed in three or more robots are connected by a communication connection means to cooperatively control, the present invention can be suitably executed and the control units can be synchronized with each other with high precision and can be operated cooperatively.

The invention claimed is:

1. A cooperative control system of robots comprising:
    a plurality of control units for controlling individually respective operations of a plurality of robots in synchronization with a timing signal generated in a predetermined minimum interruption period,
    communication connection means communicatably connecting said control units to each other to constitute a network,
    input means which are respectively installed in said control units and input operation instructions of said robots,
    storage means which are respectively installed in said control units and store programs for operating said robots in response to said operation instructions of said robots, and
    timing signal generation means which are respectively installed in said control units and generate timing signals in said minimum interruption period, wherein:

said control units can execute selectively at least one of an independent function execution mode, a master function execution mode, and a slave function execution mode by said programs stored in said storage means, when one of said plurality of control units is set to said master function execution mode by execution of said programs, at least one of residual control units excluding said control unit which is set to said master function execution mode among said plurality of control units is set to said slave function execution mode for executing a slave operation by execution of said programs, a master robot controlled by said control unit set to said master function execution mode and a slave robot controlled by said control unit set to said slave function execution mode are cooperatively operated, said control unit set to said slave function execution mode changes said minimum interruption period (Ts(b)) of said control unit set to said slave function execution mode so as to make a communication delay time (tb−ta) from a time (ta) when said control unit set to said master function execution mode transmits an operation instruction to a time (tb) when said control unit set to said slave function execution mode receives said operation instruction and starts controlling its own robot equal to a predetermined time (T), and said predetermined time (T) is selected to less than a control period (W) of each control unit.

2. A cooperative control system of robots according to claim 1, wherein said control unit set to said master function execution mode transmits an instruction to its own robot while being delayed by said communication delay time (tb−ta) for said control unit set to said slave function execution mode.

3. A cooperative control system of robots according to claim 1, wherein in a cooperative operation, when said control unit set to said slave function execution mode is input said operation instruction from said input means, said operation instruction is input to said control unit set to said master function execution mode via said communication connection means, and said control unit set to said master function execution mode executes said control operation in response to said operation instruction input via said communication connection means.

4. A cooperative control system of robots according to claim 1, wherein said control units are respectively equipped with input/output units and during a cooperative operation, in said control unit set to said master function execution mode and said control unit set to said slave function execution mode among said plurality of control units, said control unit set to said master function execution mode, via said communication connection means, inputs and outputs signals using said input/output unit of said control unit set to said slave function execution mode.

5. A cooperative control system of robots according to claim 1, wherein said control units respectively have emergency stop means for stopping a cooperative operation of each control unit during said cooperative operation, and an emergency stop signal generated from any one of said emergency stop means is input to control means equipped with said emergency stop means generating said emergency stop signal and is simultaneously input to residual control means via said communication connection means to stop operations of all said robots.

6. A cooperative control system of robots according to claim 1, wherein each control unit is provided with a coordinate system of each robot, and a positioning tool whose size is known is removably installed at a tip of an arm of each robot, and tips of positioning tools of said robots which are mutually neighboring are put opposite each other at least at three points so as to be arranged at a same position, thus a coordinate transformation matrix for each robot is obtained, and a cooperative operation is executed using said coordinate transformation matrix.

7. A cooperative control system of robots according to claim 6, wherein in said cooperative operation, a relative position of said robot set to said slave function execution mode to said robot set to said master function execution mode is interpolated so as to meet a relative position relationship at a taught operation start point and a relative position relationship at a taught operation end point.

8. A cooperative control system of robots comprising:

a plurality of control units for controlling individually respective operations of a plurality of robots in synchronization with a timing signal generated in a predetermined minimum interruption period, communication connection means communicatably connecting said control units to each other to constitute a network, input means which are respectively installed in said control units and input operation instructions of said robots, storage means which are respectively installed in said control units and store programs for operating said robots in response to said operation instructions of said robots, and timing signal generation means which are respectively installed in said control units and generate timing signals in said minimum interruption period, wherein:

said control units can execute selectively at least one of an independent function execution mode, a master function execution mode, and a slave function execution mode by said programs stored in said storage means, when one of said plurality of control units is set to said master function execution mode by execution of said programs, at least one of residual control units excluding said control unit which is set to said master function execution mode among said plurality of control units is set to said slave function execution mode for executing a slave operation by execution of said programs, and a master robot controlled by said control unit set to said master function execution mode and a slave robot controlled by said control unit set to said slave function execution mode are cooperatively operated, said control units are respectively equipped with input/output units and during a cooperative operation, in said control unit set to said master function execution mode and said control unit set to said slave function execution mode among said plurality of control units, said control unit set to said master function execution mode, via said communication connection means, inputs and outputs signals for an external device using said input/output unit of said control unit set to said slave function execution mode to control said input/output unit, said control unit set to said slave function execution mode changes said minimum interruption period (Ts(b)) of said control unit set to said slave function execution mode so as to make a communication delay time (tb−ta) from a time (ta) when said control unit set to said master function execution mode transmits an operation instruction to a time (tb) when said control unit set to said slave function execution mode receives said operation instruction and starts controlling its own robot equal to a predetermined time (T), and said predetermined time (T) is selected to less than a control period (W) of each control unit.

9. A cooperative control system of robots according to claim 8, wherein said control unit set to said master function execution mode transmits an instruction to its own robot while being delayed by said communication delay time (tb−ta) for said control unit set to said slave function execution mode.

10. A cooperative control system of robots according to claim 8, wherein in a cooperative operation, when said control unit set to said slave function execution mode is input said operation instruction from said input means, said operation instruction is input to said control unit set to said master function execution mode via said communication connection means, and said control unit set to said master function execution mode executes said control operation in response to said operation instruction input via said communication connection means.

11. A cooperative control system of robots according to claim 8, wherein said control units respectively have emergency stop means for stopping a cooperative operation of each control unit during said cooperative operation, and an emergency stop signal generated from any one of said emergency stop means is input to control means equipped with said emergency stop means generating said emergency stop signal and is simultaneously input to residual control means via said communication connection means to stop operations of all said robots.

12. A cooperative control system of robots according to claim 8, wherein each control unit is provided with a coordinate system of each robot, and a positioning tool whose size is known is removably installed at a tip of an arm of each robot, and tips of positioning tools of said robots which are mutually neighboring are put opposite each other at least at three points so as to be arranged at a same position, thus a coordinate transformation matrix for each robot is obtained, and a cooperative operation is executed using said coordinate transformation matrix.

13. A cooperative control system of robots according to claim 12, wherein in said cooperative operation, a relative position of said robot set to said slave function execution mode to said robot set to said master function execution mode is interpolated so as to meet a relative position relationship at a taught operation start point and a relative position relationship at a taught operation end point.

14. A cooperative control system of robots comprising:
a plurality of control units for controlling individually respective operations of a plurality of robots in synchronization with a timing signal generated in a predetermined minimum interruption period,
communication connection means communicatably connecting said control units to each other to constitute a network,
input means which are respectively installed in said control units and input operation instructions of said robots,
storage means which are respectively installed in said control units and store programs for operating said robots in response to said operation instructions of said robots, and
timing signal generation means which are respectively installed in said control units and generate timing signals in said minimum interruption period, wherein:
said control units can execute selectively at least one of an independent function execution mode, a master function execution mode, and a slave function execution mode by said programs stored in said storage means,
when one of said plurality of control units is set to said master function execution mode by execution of said programs, at least one of residual control units excluding said control unit which is set to said master function execution mode among said plurality of control units is set to said slave function execution mode for executing a slave operation by execution of said programs,
a master robot controlled by said control unit set to said master function execution mode and a slave robot controlled by said control unit set to said slave function execution mode are cooperatively operated,
in said cooperative operation, regarding a relative position of said robot set to said slave function execution mode in process of motion to said robot set to said master function execution mode, a motion interim point of said robot set to said slave function execution mode is calculated in conformity with a motion interim point of said robot set to said master function execution mode so as to meet a relative position relationship at a taught operation start point and a relative position relationship at a taught operation end point,
said control unit set to said slave function execution mode changes said minimum interruption period (Ts(b)) of said control unit set to said slave function execution mode so as to make a communication delay time (tb−ta) from a time (ta) when said control unit set to said master function execution mode transmits an operation instruction to a time (tb) when said control unit set to said slave function execution mode receives said operation instruction and starts controlling its own robot equal to a predetermined time (T), and
said predetermined time (T) is selected to less than a control period (W) of each control unit.

15. A cooperative control system of robots according to claim 14, wherein said control unit set to said master function execution mode transmits an instruction to its own robot while being delayed by said communication delay time (tb−ta) for said control unit set to said slave function execution mode.

16. A cooperative control system of robots according to claim 14, wherein in a cooperative operation, when said control unit set to said slave function execution mode is input said operation instruction from said input means, said operation instruction is input to said control unit set to said master function execution mode via said communication connection means, and said control unit set to said master function execution mode executes said control operation in response to said operation instruction input via said communication connection means.

17. A cooperative control system of robots according to claim 14, wherein said control units are respectively equipped with input/output units and during a cooperative operation, in said control unit set to said master function execution mode and said control unit set to said slave function execution mode among said plurality of control units, said control unit set to said master function execution mode, via said communication connection means, inputs and outputs signals using said input/output unit of said control unit set to said slave function execution mode.

18. A cooperative control system of robots according to claim 14, wherein said control units respectively have emergency stop means for stopping a cooperative operation of each control unit during said cooperative operation, and an emergency stop signal generated from any one of said emergency stop means is input to control means equipped with said emergency stop means generating said emergency stop signal and is simultaneously input to residual control means via said communication connection means to stop operations of all said robots.

19. A cooperative control system of robots according to claim 14, wherein each control unit is provided with a coordinate system of each robot, and a positioning tool whose size is known is removably installed at a tip of an arm of each robot, and tips of positioning tools of said robots which are mutually neighboring are put opposite each other at least at three points so as to be arranged at a same position, thus a coordinate transformation matrix for each robot is obtained, and a cooperative operation is executed using said coordinate transformation matrix.

20. A cooperative control system of robots according to claim 1, wherein said predetermined time (T) is selected to be less than a control period (W) of each control unit, said control period (W) being a time interval for transmitting said operation.

21. A cooperative control system of robots according to claim 8, wherein said predetermined time (T) is selected to be less than a control period (W) of each control unit, said control period (W) being a time interval for transmitting said operation.

22. A cooperative control system of robots according to claim 14, wherein said predetermined time (T) is selected to be less than a control period (W) of each control unit, said control period (W) being a time interval for transmitting said operation.

* * * * *